US011227402B2

(12) United States Patent
Chen

(10) Patent No.: US 11,227,402 B2
(45) Date of Patent: Jan. 18, 2022

(54) VELOCITY MEASURING DEVICE

(71) Applicant: Catch Technology, Inc., Hsinchu Science Park (TW)

(72) Inventor: Jian-An Chen, Taichung (TW)

(73) Assignee: iCatch Technology, Inc. (TW)

(*) Notice: Subject to any disclaimer, the term of this patent is extended or adjusted under 35 U.S.C. 154(b) by 0 days.

(21) Appl. No.: 16/887,883

(22) Filed: May 29, 2020

(65) Prior Publication Data

US 2021/0374983 A1 Dec. 2, 2021

(51) Int. Cl.
*G06T 7/521* (2017.01)
*G06T 7/246* (2017.01)
*G06T 7/262* (2017.01)
*G06T 7/60* (2017.01)

(52) U.S. Cl.
CPC .............. *G06T 7/521* (2017.01); *G06T 7/246* (2017.01); *G06T 7/262* (2017.01); *G06T 7/60* (2013.01)

(58) Field of Classification Search
CPC ........... G06T 7/521; G06T 7/60; G06T 7/262; G06T 7/246
See application file for complete search history.

(56) References Cited

U.S. PATENT DOCUMENTS

| 2014/0168424 A1* | 6/2014 | Attar | H04N 5/247 348/140 |
| 2014/0363100 A1* | 12/2014 | Usikov | H04N 13/261 382/285 |
| 2016/0094787 A1 | 3/2016 | Govil et al. | |
| 2018/0295274 A1* | 10/2018 | Nakayama | H01L 27/14643 |

FOREIGN PATENT DOCUMENTS

| WO | 2019066563 A1 | 4/2019 |
| WO | 2019145516 A1 | 8/2019 |
| WO | 2019180033 A1 | 9/2019 |

* cited by examiner

*Primary Examiner* — John B Strege
*Assistant Examiner* — Daniel C Chang
(74) *Attorney, Agent, or Firm* — Innovation Counsel LLP

(57) ABSTRACT

A velocity measuring device includes an event sensor, a ranging sensor and a controller. The event sensor could detect a first image frame of an object along a plane at a first time point and detect a second image frame of the object at a second time point. The ranging sensor could detect a first depth of the object along a depth direction at the first time point, wherein the depth direction is substantially perpendicular to the plane and detect a second depth of the object along the depth direction at the second time point. The controller could obtain first-dimensional velocity and a second-dimensional velocity along the plane according to the first image frame, the second image frame, the first depth and the second depth, and obtain a third-dimensional velocity along the depth direction according to the first depth or the second depth.

7 Claims, 5 Drawing Sheets

VELOCITY MEASURING DEVICE

BACKGROUND

Technical Field

The disclosure relates in general to a measuring device and a measuring method using the same, and more particularly to a velocity measuring device and a velocity measuring method using the same.

Description of the Related Art

There are many conventional measuring device for measuring velocity of an object. According to common measurement methods, the conventional measuring devices include Doppler Radar and Laser Velocimetry. However, Doppler Radar only measure one-dimensional velocity, while Laser Velocimetry is restricted to be aimed at the single object when measuring and needs high power for emitting laser.

SUMMARY

According to a first aspect of the present disclosure, a velocity measuring device is provided. The velocity measuring device is for measuring a three-dimensional velocity of an object and includes an event sensor, a ranging sensor and a controller. The event sensor is configured to detect a first image frame of the object along a plane at a first time point; and detect a second image frame of the object along the plane at a second time point. The ranging sensor is configured to detect a first depth of the object along a depth direction at the first time point, wherein the depth direction is substantially perpendicular to the plane and detect a second depth of the object along the depth direction at the second time point. The controller is configured to obtain a first-motion vector and a second-motion vector of the object along the plane according to the first image frame and the second image frame, obtain a third-dimensional velocity of the object along the depth direction according to the first depth and the second depth, and obtain a first-dimensional velocity of the first motion vector and a second-dimensional velocity of the second motion vector according to the first depth or the second depth.

According to a second aspect of the present disclosure, a velocity measuring device is provided. The velocity measuring device is for measuring a three-dimensional velocity of an object and includes a first event sensor, a second event sensor and a controller. The first event sensor is configured to detect a first image frame of the object along a plane at a first time point; and detect a second image frame of the object along the plane at a second time point. The second event sensor is configured to detect a third image frame of the object along the plane at the first time point, and detect a fourth image frame of the object along the plane at the second time point. The controller is configured to obtain a first-motion vector and a second-motion vector of the object along the plane according to the first image frame and the second image frame, use a stereo method, obtain a third-dimensional velocity of the object along a depth direction according to the first image frame, the second image frame, the third image frame and the fourth image frame, and obtain a first-dimensional velocity of the first-motion vector and a second-dimensional velocity of the second-motion vector according to the first image frame, the second image frame, the third image frame and the fourth image frame.

According to a third aspect of the present disclosure, a velocity measuring device is provided. The velocity measuring device includes a first event sensor, a second event sensor and a controller. The first event sensor is configured to detect a first image frame of the object along a plane at a first time point, and detect a second image frame of the object along the plane at a second time point. The second event sensor is configured to detect a third image frame of the object along the plane at the first time point, and detect a fourth image frame of the object along the plane at the second time point. The controller is configured to obtain a first third-dimensional coordinate of an event feature along a depth direction according the first image frame and third image frame, obtain a first first-dimensional coordinate and a first second-dimensional coordinate of the event feature along a plane according the first image frame or the second image frame, obtain a second third-dimensional coordinate of an event feature along the depth direction according the second image frame and fourth image frame, obtain a second first-dimensional coordinate and a second second-dimensional coordinate of the event feature along the plane according the third image frame or the fourth image frame; and obtain the three-dimensional velocity of the event feature according the first first-dimensional coordinate, the first second-dimensional coordinate, the first third-dimensional coordinate, the second first-dimensional coordinate, the second second-dimensional coordinate and the second third-dimensional coordinate.

The above and other aspects of the disclosure will become better understood with regard to the following detailed description of the non-limiting embodiment(s). The following description is made with reference to the accompanying drawings.

DETAILED DESCRIPTION

Several embodiments are disclosed below for elaborating the invention. Those embodiments are for the purpose of elaboration only, not for limiting the scope of protection of the invention. Besides, secondary elements are omitted in the following embodiments to highlight the technical features of the invention.

Figure 1A:
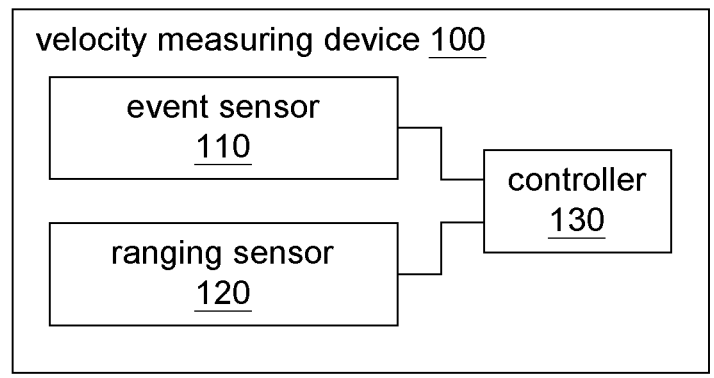
FIG. 1A illustrates a diagram view of function block of a velocity measuring device according to one embodiment.
Figure 1B:
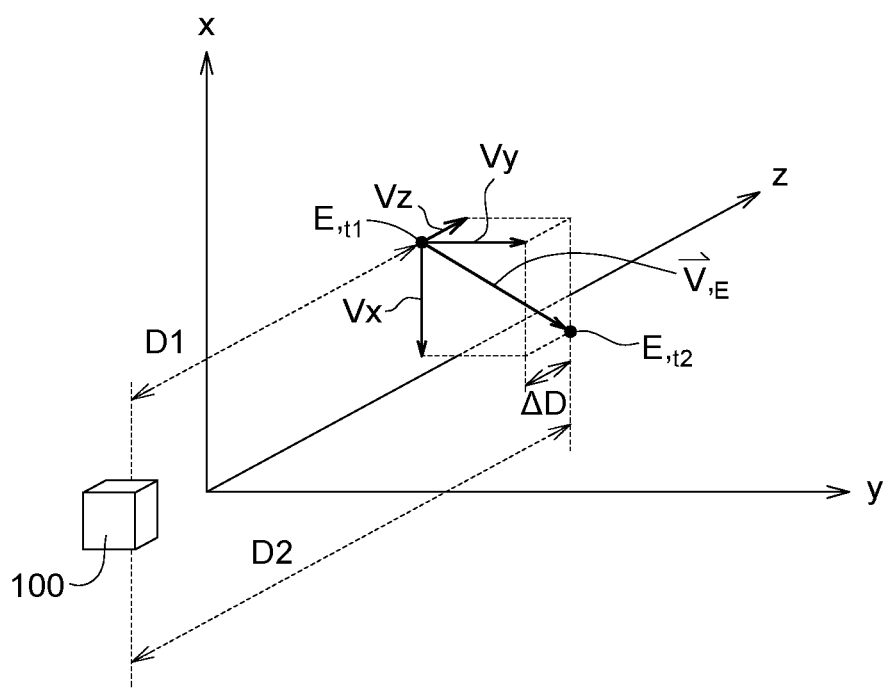
FIG. 1B illustrates a diagram view of the velocity measuring device of FIG. 1A detecting the motion of the event feature of the object.
Figure 1C:
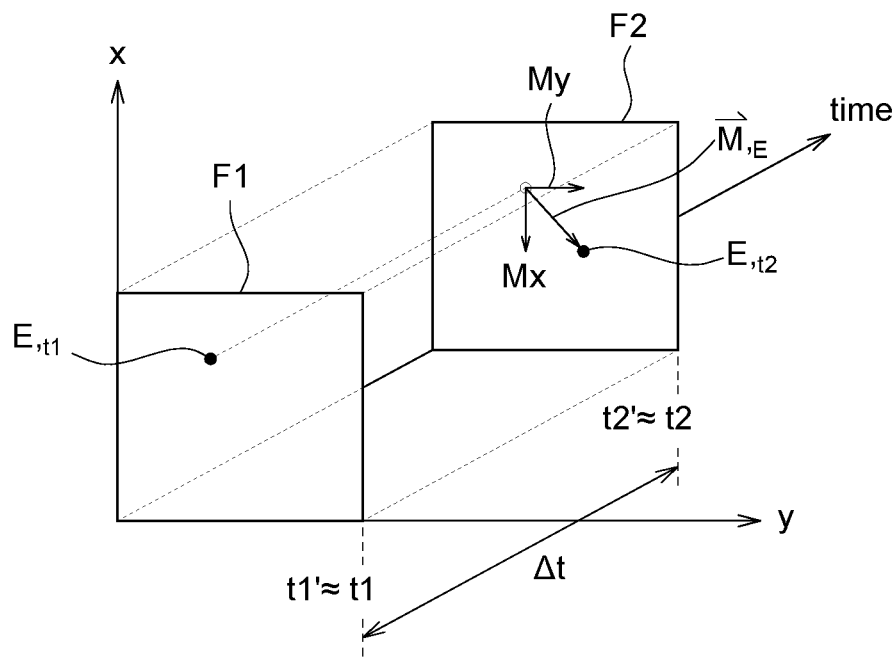
FIG. 1C illustrates a diagram view of a plurality of image frames in time axis detected by the velocity measuring device of FIG. 1A.
Figure 1D:
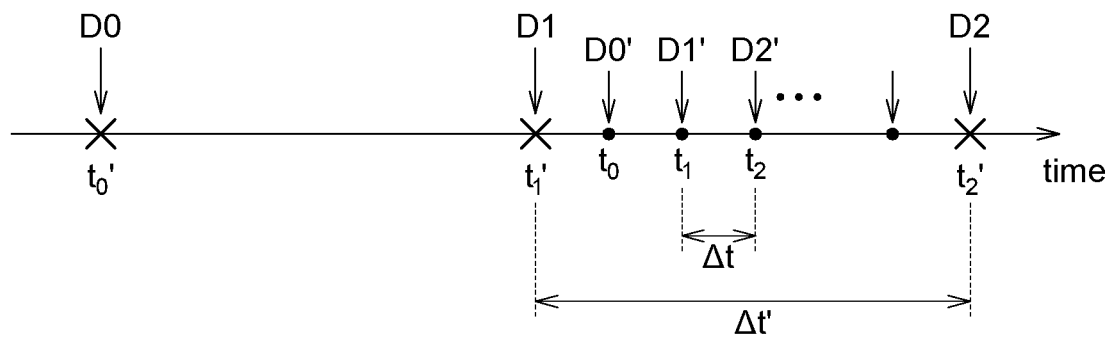
FIG. 1D illustrates a diagram view of sampling time of the event sensor and sampling time of the ranging sensor of FIG. 1A being different.

Referring to FIGS. 1A to 1D, FIG. 1A illustrates a diagram view of function block of a velocity measuring device 100 according to one embodiment, FIG. 1B illustrates a diagram view of the velocity measuring device 100 of FIG. 1A detecting the motion of the event feature of the object, FIG. 10 illustrates a diagram view of a plurality of image frames in time axis detected by the velocity measuring device 100 of FIG. 1A, and FIG. 1D illustrates a diagram view of sampling time of the event sensor 110 and sampling time of the ranging sensor 120 of FIG. 1A being different.

The velocity measuring device 100 could be disposed on movable device, for example, transportation (for example, vehicle, aircraft, drone), etc., and the velocity measuring device 100 could measure relative velocity with respect to the movable device. In another embodiment, the velocity measuring device 100 could be disposed on stationary device, and the velocity measuring device 100 could measure absolute velocity with respect to the stationary device.

The velocity measuring device 100 includes an event sensor 110, a ranging sensor 120 and a controller 130. At least two of the event sensor 110, the ranging sensor 120 and the controller 130 could be integrated into one piece, or at least one of the event sensor 110 and the ranging sensor 120 could be integrated into the controller 130. In addition, the event sensor 110, the ranging sensor 120 and the controller 130 could be physical circuit structure (for example, chip) formed by using semiconductor process technology.

The event sensor 110 could sense motion of an object. The object is, for example, vehicle, organism or any to-be-detected object. The event sensor 110 is, for example, imaging sensor, and includes a plurality of pixels (not illustrated), wherein only the pixel which senses variation (called "event") of brightness would output signal to the controller 130, and other pixel which do not sense variation of brightness would not output any signal to the controller 130. Thus, the event sensor 110 possesses the advantage of power saving. In addition, the sampling time of the event sensor 110 belongs to microsecond level, and thus the event sensor 110 could sense a motion trajectory of the object with high temporal resolution.

As illustrated in FIGS. 1B and 10, the event sensor 110 is configured to detect a plurality of image frames of an object along a plane P (for example, x-y plane) at a plurality of different time. Adjacent two of the image frames is taken as an example, the event sensor 110 could (1) detect a first image frame F1 of the object along the plane P at a first time point t1, and (2) detect a second image frame F2 of the object along the plane P at a second time point t2. The first image frame F1 includes at least one event feature, for example, an event feature $E_{,t1}$, and the second image frame F2 includes at least one event feature, for example, an event feature $E_{,t2}$.

In addition, the event feature $E_{,t1}$, and the event feature $E_{,t2}$ are not the same geometric point of the object, and the event feature $E_{,t1}$, and the event feature $E_{,t2}$ have the same or similar features or local event distribution.

In order to reduce noise and get more robust event information, when the event sensor 110 accumulates the number of event features at each pixel of event sensor 110 for a short period of time (micro sec level) to generate the (one) image frame.

The controller 130 is configured to obtain a first motion vector Mx and second motion vector $M_y$ of the object along the plane P according to the first image frame F1 and the second image frame F2. For example, the controller 130 could obtain the first motion vector $M_x$ along x axis and the second motion vector $M_y$ along y axis in the plane P according to the motion of the event feature from the first time point t1 to the second time point t2. In an embodiment, the first motion vector $M_x$ is substantially perpendicular the second motion vector $M_y$.

The ranging sensor 120 could sense the distance between the velocity measuring device 100 and the object along a depth direction (for example, z-axis) by using ToF (Time of Fly) technology, stereo vision technology, machine learning (for example, Deep Learning Network, DNN), etc. In another embodiment, the ranging sensor 120 is, for example, ToF sensor (or camera), stereo vision sensor (or camera), DNN sensor (or camera) or Lidar device.

As illustrated in FIG. 1B, the ranging sensor 120 is configured to (1) detect a first depth D1 of the object along a depth direction (for example, the z-axis) at a first time point t1', wherein the depth direction is substantially perpendicular to the plane P, and (2) detect a second depth D2 of the object along the depth direction at a second time point t2'. The sampling frequency of the ranging sensor 120 is different from that of the event sensor 110. For example, sampling time of the ranging sensor 120 is less than that of the event sensor 110, and thus the first time point t1' and the first time point t1 are not the same time point, and the second time point t2' and the second time point t2 are not the same time point, and the time difference Δt (illustrated in FIG. 1D) between the first time t1 and the second time t2 is less than the time difference Δt' (illustrated in FIG. 1D) between the first time t1' and the second time t2'.

The controller 130 is configured to: (1) obtain the first motion vector $M_x$ and the second motion vector $M_y$ of the object along the plane according to the first image frame F1 and the second image frame F2; (2) obtain a third-dimensional velocity $V_z$ of the object along the depth direction according to the first depth D1 and the second depth D2; (3) obtain a first-dimensional velocity $V_x$ of the first motion vector $M_x$ and a second-dimensional velocity $V_y$ of the second motion vector $M_y$ according to the first depth D1 or the second depth D2. As shown in FIG. 1C, the first motion vector $M_x$ and the second motion vector $M_y$ are combined into a composite vector $M_{,E}$.

Furthermore, as shown in FIG. 1D, the controller 130 could (1) obtain the first depth D1' at the first time point t1 according the depths obtained by the ranging sensor 120 using extrapolation method, (2) obtain the second depth D2' at the second time point t2 according the depths obtained by the ranging sensor 120 using extrapolation method using extrapolation method, and (3) obtain the third-dimensional velocity $V_z$ in depth direction according to a depth difference ΔD' between the first depth D1' and the second depth D2' and the time difference Δt between the first time point t1 and the second time point t2. (that is, the value of $V_z$=ΔD'/Δt). In an embodiment, the time difference Δt (for the event sensor 110) is microseconds, larger or smaller, and the time difference Δt' (for the ranging sensor 120) is milliseconds, larger or smaller. The velocity measuring device 100 could measure the three-dimensional velocity $V_{,E}$ of the object by fusing the first-dimensional velocity $V_x$, the second-dimensional velocity $V_y$ and the third-dimensional velocity $V_z$.

Although the number of image frames in the above embodiment is described using two frames as an example, the present invention is not limited to this. In another embodiment, the number of the image frames could be more than two. The velocity measuring device 100 could obtain a plurality of the three-dimensional velocity $V_{z,E}$ of the object at a plurality of time points according to a plurality of the image frames.

Although the number of event features in the above embodiment is described using one as an example, the present invention is not limited to this. In another embodiment, the number of the event features in any image frame could be more than one.

Figure 2A:
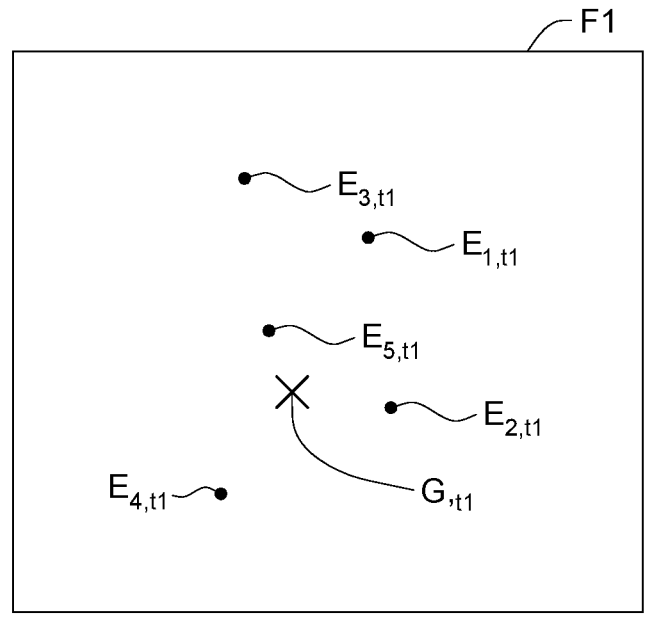
FIG. 2A illustrates a diagram view of a plurality of first event features in the first image frame detected by the velocity measuring device.
Figure 2B:
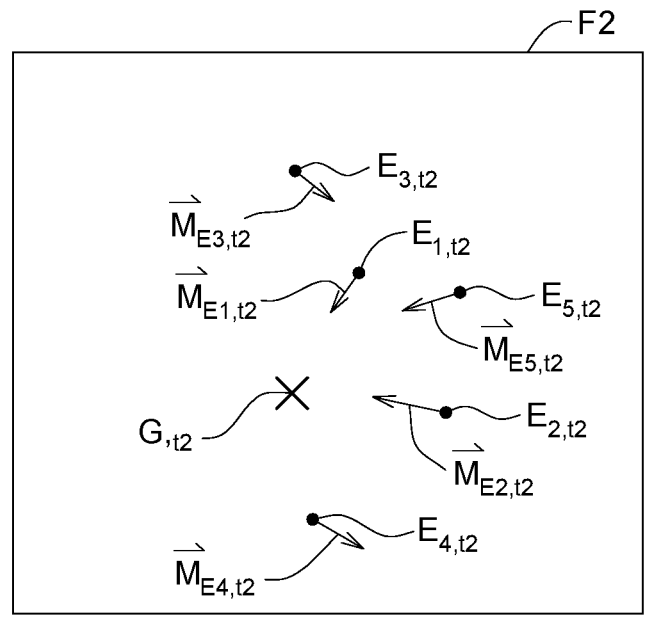
FIG. 2B illustrates a diagram view of a plurality of second event features in the second image frame detected by the velocity measuring device.
Figure 2C:
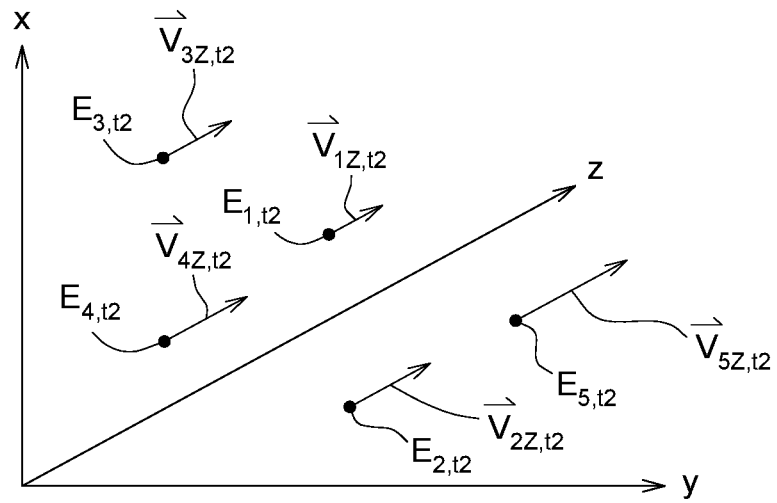
FIG. 2C illustrates a diagram view of a plurality of the third-dimensional velocities of the second event features of FIG. 2B.

Referring to FIGS. 2A to 2C, FIG. 2A illustrates a diagram view of a plurality of first event features $E_{1,t1}$ to $E_{5,t1}$ in the first image frame F1 detected by the velocity measuring device 100, FIG. 2B illustrates a diagram view of a plurality of second event features $E_{1,t2}$ to $E_{5,t2}$ in the second image frame F2 detected by the velocity measuring device 100, and FIG. 2C illustrates a diagram view of a plurality of the third-dimensional velocities $V_{1z,t2}$ to $V_{5z,t2}$ of the second event features $E_{1,t1}$ to $E_{5,t1}$ of FIG. 2B.

The first image frame F1 includes a plurality of the first event features $E_{1,t1}$ to $E_{5,t1}$, and the second image frame F2 includes a plurality of second event features $E_{1,t2}$ to $E_{5,t2}$. The controller 130 is further configured to: (1) obtain a first geometric center $G_{,t1}$ of the first event features $E_{1,t1}$ to $E_{5,t1}$, (2) obtain a second geometric center $G_{,t2}$ of the second event features $E_{1,t2}$ to $E_{5,t2}$ and (3) obtain the first motion vector $M_x$ and the second motion vector $M_y$ of the object along the plane according to the first geometric center $G_{,t1}$, and the second geometric center $G_{,t2}$. In an embodiment, the first geometric center $G_{,t1}$, and the second geometric center $G_{,t2}$ are, for example, centroids.

In addition, the controller 130 is configured to obtain the first-dimensional velocity $V_x$, the second-dimensional velocity $V_y$ and the third-dimensional velocity $V_z$ of the second geometric center $G_{,t2}$ using the calculation method similar to that of the embodiment described above.

In another embodiment, the controller 130 is further configured to: (1) obtain the first-dimensional velocity $V_x$ and the second-dimensional velocity $V_y$ of each of the event feature $E_{1,t2}$ to $E_{5,t2}$ using the calculation method similar to that of the embodiment described above, (2) obtain the third-dimensional velocity $V_z$ of each of the event feature $E_{1,t2}$ to $E_{5,t2}$ using the calculation method similar to that of the embodiment described above, (3) average the first-dimensional velocities $V_x$ of the event features $E_{1,t2}$ to $E_{5,t2}$, (4) average the second-dimensional velocities $V_y$ of the event features $E_{1,t2}$ to $E_{5,t2}$, and (5) average the third-dimensional velocities $V_z$ of the event features $E_{1,t2}$ to $E_{5,t2}$.

In addition, although the number of object in the previous embodiment is described by taking one as an example, the present invention is not limited to this. In another embodiment, the controller 130 could recognize/determine the trajectory of each of a plurality of objects according to the events in each frame. In other words, the velocity measuring device 100 could measure the velocities of a plurality of the objects simultaneously.

Figure 3A:
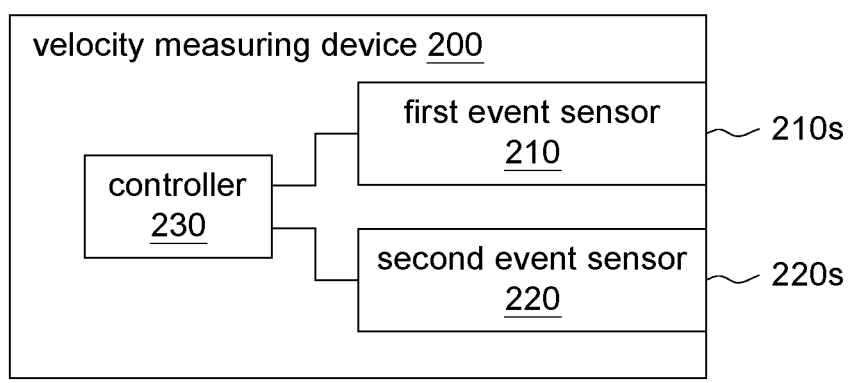
FIG. 3A illustrates a diagram view of function block of a velocity measuring device according to another embodiment.
Figure 3B:
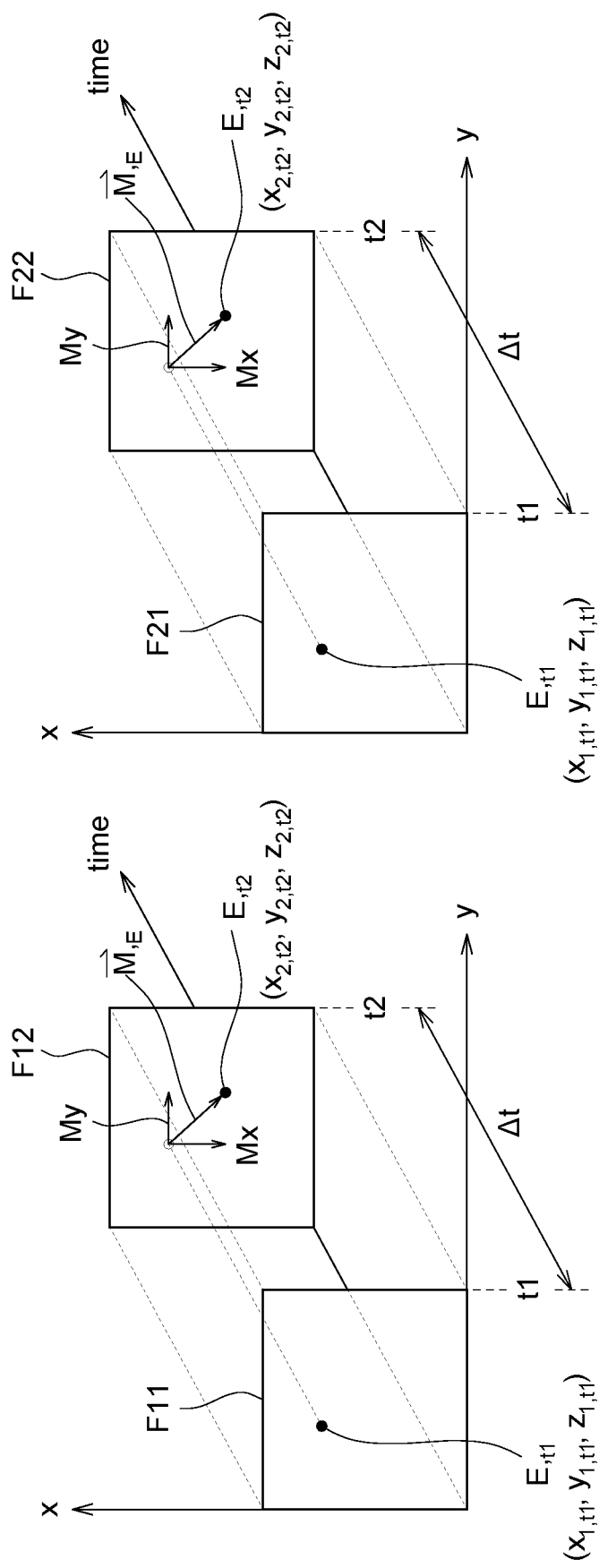
FIG. 3B illustrates a diagram view of a plurality of image frames in time axis detected by the velocity measuring device of FIG. 3A.

Referring to FIGS. 3A and 3B, FIG. 3A illustrates a diagram view of function block of a velocity measuring device 200 according to another embodiment, and FIG. 3B illustrates a diagram view of a plurality of image frames in time axis detected by the velocity measuring device 200 of FIG. 3A.

The velocity measuring device 200 could be disposed on the movable device, for example, transportation (for example, vehicle, aircraft, drone), etc., and the velocity measuring device 200 could measure relative velocity with respect to the movable device. In another embodiment, the velocity measuring device 200 could be disposed on stationary device, and the velocity measuring device 200 could measure absolute velocity with respect to the stationary device.

The velocity measuring device 200 includes a first event sensor 210, a second event sensor 220 and a controller 230. At least two of the first event sensor 210, the second event sensor 220 and the controller 230 could be integrated into one piece, or at least one of the first event sensor 210 and the second event sensor 220 could be integrated into the controller 230. In addition, the first event sensor 210, the second event sensor 220 and the controller 230 could be physical circuit structure (for example, chip) formed by using semiconductor process technology.

The first event sensor 210 and/or the second event sensor 220 have the features the same as or similar to that of the event sensor 110, and the similarities are not repeated here. In addition, the first event sensor 210 has the structure the same as or similar to that of the second event sensor 220, or the first event sensor 210 and the second event sensor 220 are the same kind/type of components.

The first event sensor 210 is configured to detect a plurality of the image frame of the object along the plane P (for example, x-y plane) at a plurality of different time. Adjacent two of the image frames is taken as an example, the first event sensor 210 could detect a first image frame F11 of the object along the plane P at the first time point t1, and detect a second image frame F12 of the object along the plane P at the second time point t2. The first image frame F11 includes at least one event feature, for example, an event feature $E_{,t1}$, and the second image frame F12 includes at least one event feature, for example, an event feature $E_{,t2}$.

The second event sensor 220 is configured to detect a plurality of the image frame of the object along the plane P at a plurality of different time. Adjacent two of the image frames is taken as an example, the second event sensor 220 could detect a third image frame F21 of the object along the plane P at the first time point t1, and detect a fourth image frame F22 of the object along the plane P at the second time point t2. The third image frame F21 includes at least one event feature, for example, the event feature $E_{,t1}$, and the fourth image frame F22 includes at least one event feature, for example, the event feature $E_{,t2}$.

The controller 230 is configured to: (1) obtain the first motion vector $M_x$ and the second motion vector $M_y$ of the object along the plane P according to the first image frame F11 and the second image frame F12 or according to the third image frame F21 and the fourth image frame F22, (2) use a stereo method, obtain the third-dimensional velocity $V_z$ of the object along the depth direction according to the first image frame F11, the second image frame F12, the third image frame F21 and the fourth image frame F22, and (3) obtain the first-dimensional velocity $V_x$ of the first motion vector $M_x$ and the second-dimensional velocity $V_y$ of the second motion vector $M_y$ according to the first image frame F11, the second image frame F12, the third image frame F21 and the fourth image frame F22.

For example, the controller 230 is configured to: (1) obtain the first depth D1 (not illustrated in FIG. 3B) of the object according to the first image frame F11 and the third image frame F21 using the stereo method, (2) obtain the second depth D2 (not illustrated in FIG. 3B) of the object according to the second image frame F12 and the fourth image frame F22 using the stereo method, (3) obtain the third-dimensional velocity $V_z$ in depth direction according to the depth difference $\Delta D$ between the first depth D1 and the second depth D2 and the time difference $\Delta t$ between the first time point t1 and the second time point t2. (that is, the value of $V_z=\Delta D/\Delta t$), (4) obtain the first-dimensional velocity $V_x$ of the first motion vector $M_x$ according to depth difference $\Delta D$, and (5) obtain the second-dimensional velocity $V_y$ of the second motion vector $M_y$ according to according to depth difference $\Delta D$. In an embodiment, the time difference $\Delta t$ is microseconds or smaller. In addition, the first event sensor 210 and the second event sensor 220 are rectified after calibration, so the first image frame F11 and the third image frame F21 are coplanar, and the second image frame F12 and the fourth image frame F22 are coplanar also.

In another embodiment, as shown in FIG. 3B, the first event sensor 210 is configured to: (1). detect the first image frame F11 of the object along the plane P at the first time point t1; and (2). detect the second image frame F12 of the object along the plane P at the second time point t2. The second event sensor 220 is configured to: (1). detect the third image frame F21 of the object along the plane P at the first time point t1; and (2). detect the fourth image frame F22 of the object along the plane P at the second time point t2. The controller 230 is configured to: (1). obtain a first third-dimensional coordinate $z_{1,t1}$ of the event feature along the depth direction according the first image frame F11 and third image frame F21; (2). obtain a first first-dimensional coordinate $x_{1,t1}$ and a first second-dimensional coordinate $y_{1,t1}$ of the event feature along the plane P according the first image frame F11 or the second image frame F12; (3). obtain a second third-dimensional $z_{2,t2}$ coordinate of the event feature along the depth direction according the second image frame F12 and fourth image frame F22; (4). obtain a second first-dimensional coordinate $x_{2,t2}$ and a second second-dimensional coordinate $y_{2,t2}$ of the event feature along the plane P according the third image frame F21 or the fourth image frame F22; and (5). obtain the three-dimensional velocity $V_E$ of the event feature according the first first-dimensional coordinate $x_{1,t1}$, the first second-dimensional coordinate $y_{1,t1}$, the first third-dimensional coordinate $z_{1,t1}$, the second first-dimensional coordinate $x_{2,t2}$, the second second-dimensional coordinate $y_{2,t1}$ and the second third-dimensional coordinate $z_{2,t1}$.

For example, the controller 230 is configured to: (1). obtain the first-dimensional velocity $V_x$ according to $V_x=(x_{2,t2}-x_{1,t1})/\Delta t$; (2). obtain the second-dimensional velocity $V_y$ according to $V_y=(y_{2,t2}-y_{1,t1})/\Delta t$; (3). obtain the third-dimensional velocity $V_z$ according to $V_z=(z_{2,t2}-z_{1,t1})/\Delta t$; and (4). obtain the three-dimensional velocity $V_E$ of the object by fusing the first-dimensional velocity $V_x$, the second-dimensional velocity $V_y$ and the third-dimensional velocity $V_z$.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A velocity measuring device, for measuring a three-dimensional velocity of an object, comprises:
    an event sensor configured to:
        detect a first image frame of the object along a plane at a first time point; and
        detect a second image frame of the object along the plane at a second time point;
    a ranging sensor configured to:
        detect a first depth of the object along a depth direction at the first time point, wherein the depth direction is substantially perpendicular to the plane; and
        detect a second depth of the object along the depth direction at the second time point;
    a controller configured to:
        obtain a first motion vector and a second motion vector of the object along the plane according to the first image frame and the second image frame;
        obtain a third-dimensional velocity of the object along the depth direction according to the first depth and the second depth; and
        obtain a first-dimensional velocity of the first motion vector and a second-dimensional velocity of the second motion vector according to the first depth or the second depth;
    wherein the controller is further configured to:
        obtain a first event depth at a first event time point;
        obtain a second event depth at a second event time point; and
        obtain the third-dimensional velocity in the depth direction according to a depth difference between the first event depth and the second event depth and an event time difference between the first event time point and the second event time point;
    wherein the event time difference is less than a time difference between the first time point and the second time point.

2. The velocity measuring device according to claim 1, wherein the first motion vector is substantially perpendicular the second motion vector.

3. The velocity measuring device according to claim 1, wherein the first image frame comprises a plurality of first event features, and the second image frame comprises a plurality of second event features, and the controller is further configured to:
    obtain a first geometric center of the first event features;
    obtain a second geometric center of the second event features; and
    obtain the first motion vector and the second motion vector of the object along the plane according to the first geometric center and the second geometric center.

4. The velocity measuring device according to claim 3, wherein the controller is further configured to:
    obtain the third-dimensional velocity of the object along the depth direction according to the first geometric center and the second geometric center.

5. The velocity measuring device according to claim 1, wherein the second image frame comprises a plurality of event features, and the controller is further configured to:
    obtain the first-dimensional velocity and the second-dimensional velocity of each event feature;
    obtain the third-dimensional velocity of each event feature;
    average the first-dimensional velocities of the event features;
    average the second-dimensional velocities of the event features; and
    average the third-dimensional velocities of the event features.

6. The velocity measuring device according to claim 1, wherein the ranging sensor is ToF sensor, stereo vision sensor, DNN sensor or Lidar device.

7. A velocity measuring device, for measuring a three-dimensional velocity of an object, comprises:
  an event sensor configured to:
  detect a first image frame of the object along a plane at a first time point; and
  detect a second image frame of the object along the plane at a second time point;
  a ranging sensor configured to:
  detect a first depth of the object along a depth direction at the first time point, wherein the depth direction is substantially perpendicular to the plane; and
  detect a second depth of the object along the depth direction at the second time point;
  a controller configured to:
  obtain a first motion vector and a second motion vector of the object along the plane according to the first image frame and the second image frame;
  obtain a third-dimensional velocity of the object along the depth direction according to the first depth and the second depth; and
  obtain a first-dimensional velocity of the first motion vector and a second-dimensional velocity of the second motion vector according to the first depth or the second depth;
  wherein the second image frame comprises a plurality of event features, and
  wherein the controller is further configured to:
    obtain the first-dimensional velocity and the second-dimensional velocity of each event feature;
    obtain the third-dimensional velocity of each event feature;
    average the first-dimensional velocities of the event features;
    average the second-dimensional velocities of the event features; and
    average the third-dimensional velocities of the event features.

* * * * *

UNITED STATES PATENT AND TRADEMARK OFFICE
CERTIFICATE OF CORRECTION

PATENT NO. : 11,227,402 B2
APPLICATION NO. : 16/887883
DATED : January 18, 2022
INVENTOR(S) : Jian-An Chen It is certified that error appears in the above-identified patent and that said Letters Patent is hereby corrected as shown below:

On the Title Page

Item (71), Name of Applicant should read:
Applicant: iCatch Technology, Inc. (TW)

Signed and Sealed this
Twelfth Day of April, 2022

Drew Hirshfeld
*Performing the Functions and Duties of the
Under Secretary of Commerce for Intellectual Property and
Director of the United States Patent and Trademark Office*